United States Patent [19]

Ogawa et al.

[11] Patent Number: 4,688,919
[45] Date of Patent: Aug. 25, 1987

[54] AUTOMATIC FOCUSING CAMERA

[75] Inventors: Yukio Ogawa, Kanagawa; Hideo Taka, Tokyo, both of Japan

[73] Assignee: Canon Kabushikik Kaisha

[21] Appl. No.: 700,691

[22] Filed: Feb. 12, 1985

[30] Foreign Application Priority Data

Feb. 13, 1984 [JP] Japan .................................. 59-24686

[51] Int. Cl.$^4$ ............................................... G03B 3/00
[52] U.S. Cl. ..................................... 354/403; 354/402
[58] Field of Search ............... 354/400, 402, 403, 286; 352/140

[56] References Cited

U.S. PATENT DOCUMENTS

| 4,157,217 | 6/1979 | Isono | 352/140 |
| 4,191,460 | 3/1980 | Fujiki | 352/140 |
| 4,351,590 | 9/1982 | Hirata et al. | 354/403 |
| 4,531,822 | 7/1985 | Shenk | 352/140 |

FOREIGN PATENT DOCUMENTS 55-39809 10/1980 Japan .

Primary Examiner—Russell E. Adams
Attorney, Agent, or Firm—Toren, McGeady & Associates

[57] ABSTRACT

Disclosed is an automatic focusing camera capable of measuring a wide range of distances by setting a plurality of focus targets in the photographic picture plane, so designed that when the photographic picture angle changes due to changes in the focal length of the photographic lens the distance is measured by focus targets whose numbers corresponds to the photographic picture angles, to avoid mismeasurement of the distance.

10 Claims, 13 Drawing Figures

| DISTANCE \ LIGH EMITTING ELEMENT | 1a | 1b | 1c | 1d | 1e |
|---|---|---|---|---|---|
| D1 | A | B | C | D | E |
| D2 | B | C | D | E | F |
| D3 | C | D | E | F | G |
| D4 | D | E | F | G | H |

| LIGHT SENSING POSITION OF 3 / OUTPUT OF 17 | A | B | C | D | E | F | G | H |
|---|---|---|---|---|---|---|---|---|
| SIGNAL LINE 23 | 0 | 1 | 0 | 1 | 0 | 1 | 0 | 1 |
| SIGNAL LINE 24 | 0 | 0 | 1 | 1 | 0 | 0 | 1 | 1 |
| SIGNAL LINE 25 | 0 | 0 | 0 | 0 | 1 | 1 | 1 | 1 |

| 74 \ 73 | 0 | 1 |
|---|---|---|
| 0 | D1 | D2 |
| 1 | D3 | D4 |

AUTOMATIC FOCUSING CAMERA

BACKGROUND OF THE INVENTION

1. Field of the Invention

The present invention relates to an automatic focusing camera one particularly, having a photographic lens with variable focal length.

2. Description of the Prior Art

Until now, the so-called active type automatic focusing camera has been designed so that photographic lens focusing is adjusted by projecting the light beam from the light emitting elements toward the object and detecting the light beam reflected from the object by the light sensing element. However, in the conventional automatic focusing camera, the range in which the distance is measured (hereinafter called the focus target) is limited to a remarkably narrow range in the middle of the photographic picture plane so that the object to be photographed is not well focused unless the object to be photographed is located in a predetermined position in the middle of the photographic picture plane. Generally, the object to be photographed should be located within the distance measuring mark provided in the view finder.

Consequently, quite recently, an automatic focusing camera has been proposed, in which a plurality of focus targets are set in the photographic picture plane to obtain a well focused picture regardless of the position of the object in the photographic picture plane. FIG. 1 shows an example of the distance measuring system of such an automatic focusing camera. In the drawing, a light emitting element array 1 has a plurality of light emitting elements 1a–1e, a light projecting lens 2 projects the light beams produced by the light emitting elements 1a–1e towards respective focus targets 6a–6e provided in the horizontal direction of the photographic picture plane, and a light sensing element 3 whose signal output changes based on the incident position of the light beam, for example, a PSD (position sensitive device). A light receiving lens 4 serves to lead the projected light beam reflected from the object in the respective focus targets 6a–6e to the light sensing element 3. In this example, the projected light beams of the respective light emitting elements 1a–1e are reflected by the objects existing along the respective direction of the focus targets 6a–6e and the respective reflected light beams are sensed by the light sensing element 3 at the light sensing positions according to object distances based upon the principles of trigonometry. The output of the light sensing element 3 changes based on the light sensing position so that information regarding the distance to the focus target 6a–6e from the illuminant light emitting element 1a–1e can be obtained from the output. By obtaining the distance information for the respective targets 6a–6e a well focused picture can always be obtained regardless of the position of the object in the photographic plane.

When the focal length of the photographic lens of such an automatic focusing camera is variable, the following problems occur. The so-called variable focus camera having a photographic lens with variable focal length is disclosed in Japanese Laid-Open Patent Application No. Sho 57-141084.

In the variable focus camera, the photographic picture angle changes based on the change over of the focal length of the photographic lens so that there is a possibility that the object distance of the photographic picture plane is also measured if the above automatic focusing camera is provided with a plurality of focus targets. Namely, as is shown in FIG. 1, the photographic picture angle $\beta$ at the side of the long focal length of the photographic lens is smaller than that $\alpha$ at the side of the short focal length, so that when a plurality of focus targets 6a–6e are provided corresponding to the photographic range 5a at the side of the short focal length, the object distance outside the photographic range 5a, namely the object in the focus targets 6a and 6e are also measured. In such a case there is a danger that the result of the distance measurement would be wrong due to unnecessary distance information, while the light emitting elements 1a and 1e are also wastefully lit.

It is, accordingly, an object of the present invention to provide an automatic focusing camera capable of measuring a wide range of distances by setting a plurality of focus targets in the photographic picture plane, so designed that when the photographic picture angle changes due to the changing of the focal length of the photographic lens the distance is measured by the focus targets provided in a number corresponding to the pnotographic picture angle, in order to avoid mismeasurement of the distance.

Further objects and features of the present invention will become apparent from the following description of the preferred embodiment with reference to the accompanying drawings.

SUMMARY OF THE INVENTION

An automatic focusing camera includes distance measuring means capable of automatically measuring an object distance and change over means for changing over a distance measuring range of the distance measuring means to a range appropriate to a photographic picture angle according to the change in focal length of a photographic optical system.

DETAILED DESCRIPTION OF THE PREFERRED EMBODIMENT

The embodiment of the present invention will be described with reference to the accompanying drawings.

Figure 1:
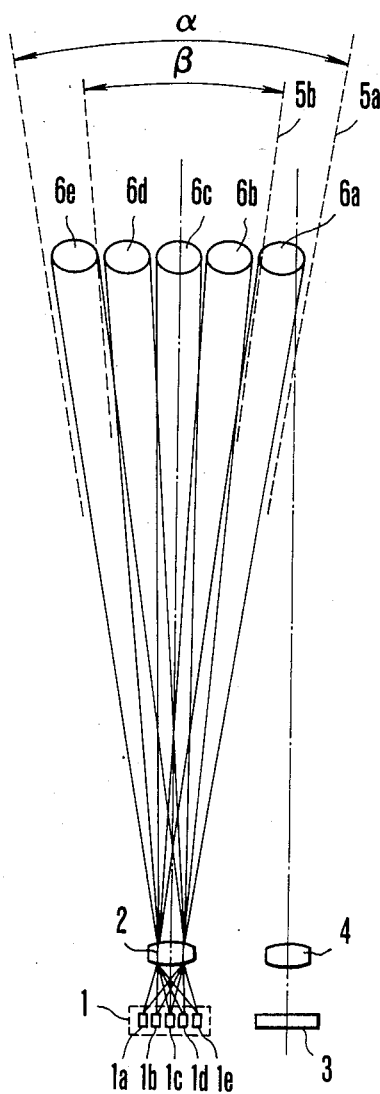
FIG. 1 shows an example of a distance measuring system capable of measuring the distance for a plurality of focus targets.
Figure 2:
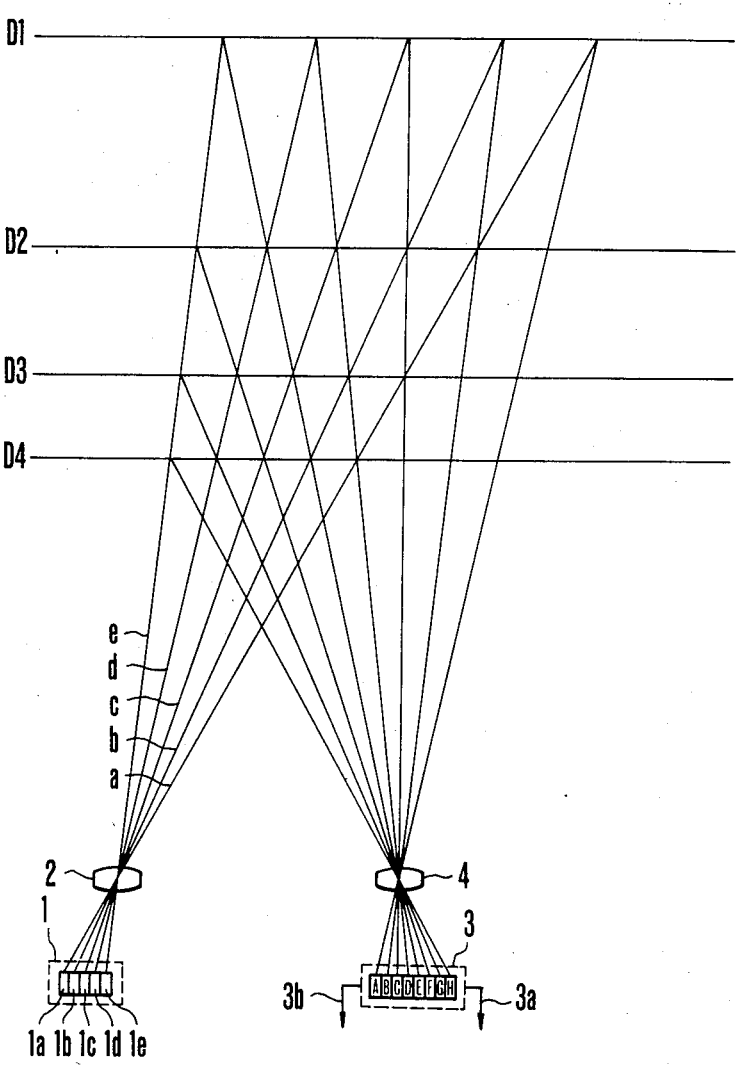
FIG. 2 shows an example of the principle of the distance measurement of the automatic focusing camera of the present invention.
Figures 3, 4:
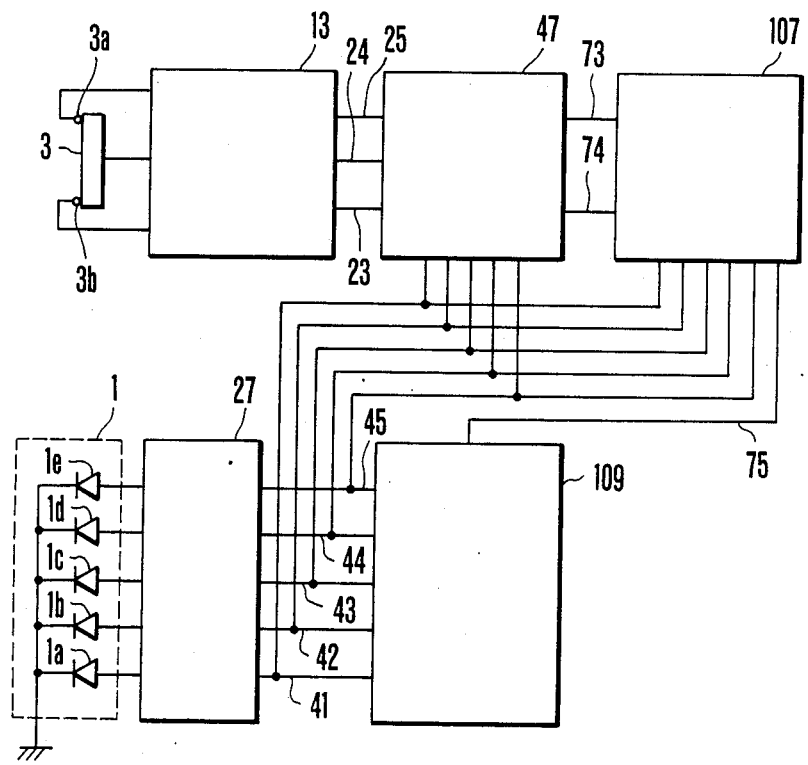
FIG. 3 shows a diagram for explaining the incident position of the light beam on the light sensing element of FIG. 2.
FIG. 4 shows the circuit of the distance measuring system of the automatic focusing camera of the present invention.

FIG. 2 shows the principle of the distance measurement of the automatic focusing camera of the present invention. In the drawing, the light emitting array is composed of the five light emitting elements $1a-1e$ arranged on the same chip in the horizontal direction of the photographic picture plane, the projection lens 2 projects a light beam a–e from each of the light emitting elements $1a-1e$ toward the focusing targets $6a-6e$, the light sensing emement 3 (hereinafter called PSD) is designed so that the rate of the outputs from terminals $3a$ and $3b$ change based on the incident position of the light beam, and the light receiving lens for 4 leads the projected light beam reflected by the object toward the PSD 3, in the same manner as shown in FIG. 1. Hereby, for the sake of a simplified explanation, the light receiving range of the PSD 3 is divided into 8 portions, namely light receiving portions A–H arranged in the horizontal direction. Hereby, the relation between each light emitting element $1a-1e$ and each light recieving portion A–H of the PSD 3 via the projected light beams a–e is as shown in FIG. 3 when the object is at D1, D2, D3 and D4. For example, when the object is at D1, the light beam "a" from the element $1a$ is incident on the portion A, the light beam "b" from the element $1b$ on the portion B, the light beam "c" from the element $1c$ on the portion C, the light beam "d" from the element $1d$ on the portion D and the light beam "e" from the element $1e$ on the portion E. As the object position changes to D2, D3 and D4, the incident position changes in the order of the light receiving portions B–F, C–G and D–H, as shown in FIG. 3

FIG. 4 shows the outline of the control system of the present embodiment. In the drawing, an incident position detecting circuit 13 detects the incident position of the light beam in the PSD 3, reference numeral 27 identifies a light emitting element driving circuit for time serially illuminating the light emitting elements $1a-1e$ in sequence, a signal converting circuit 47 converts the incident position signal obtained by the incident position detecting circuit 13 into the distance signal, a signal evaluating signal 107 selects the most proper distance signal from a plurality of distance signals obtained from the illumination of each light emitting element $1a-1e$, and a control circuit 109 controls the operation of each circuit. Furthermore, each circuit is connected to each other via signal lines 23–25, 41–45 and 73–75.

Below, the operation of each circuit will be described.

Figures 5, 6:
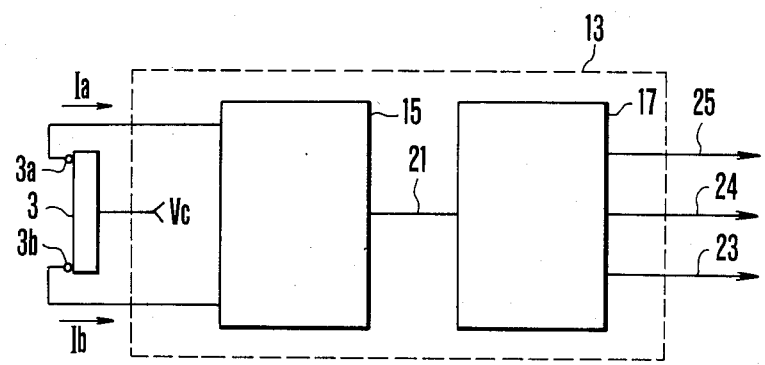
FIG. 5 shows the incident position detecting circuit of FIG. 4.
FIG. 6 shows the outputs of the incident position detecting circuit of FIG. 5.

FIG. 5 shows the incident position detecting circuit 13. A bias voltage Vc is delivered to the PSD 3. From each of the output terminals $3a$ and $3b$ photoelectric currents Ia and Ib are charged in a ratio based on the incident position of the light beam which is delivered. Reference numeral 15 identifies a conventional signal processing circuit to which the photoelectric currents Ia and Ib are input and which calculates $(Va-Vb)/(Va+Vb)$ using voltages Va and Vb based upon the photoelectric current and delivers the corresponding voltage, namely the voltage proportional to the change of the incident position of the light beam on the PSD 3 to a signal line 21. The signal processing circuit 15 includes a MOS amplifier, a high pass filter, a preamplifier, an adder, a subtractor, a sample and hold circuit, a low pass filter and so on. A A/D converter 17 converts the information of the incident position of the light beam into digital data based upon the voltage produced in the signal line 21 so as to deliver the incident position information converted into digital data to the signal lines 23–25. The outputs of the signal lines 23–25, when the light beam is incident on each light receiving portion A–H of the PSD 3, are set as shown in FIG. 6

Figure 7:
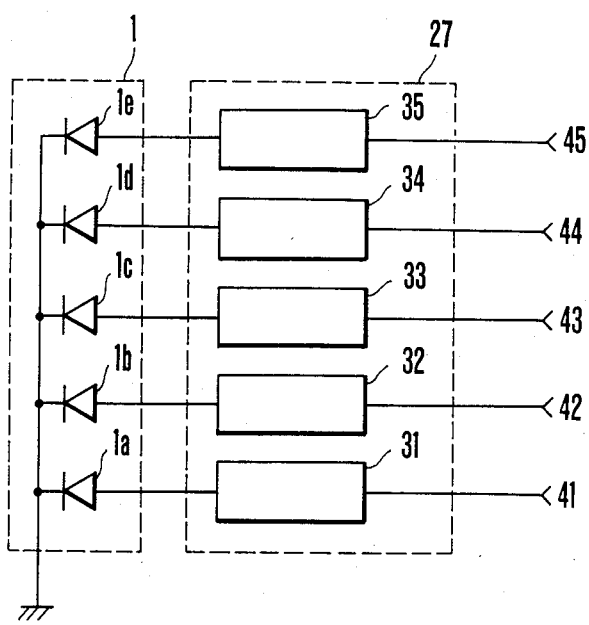
FIG. 7 shows the light emitting element driving circuit of FIG. 4.

FIG. 7 shows a light emitting element driving circuit 27. The circuit 27 has drive circuits 31–35 each connected to the signal lines 41–45 from a control circuit 109. Each drive circuit 31–35 includes a transistor, a constant current circuit and so on. A long as a high level signal is produced in the connected signal line the corresponding drive circuit 31–35 makes the individual connected light emitting element $1a-1e$ flicker based on the clock pulse from the oscillator circuit (not shown).

Figures 8, 9:
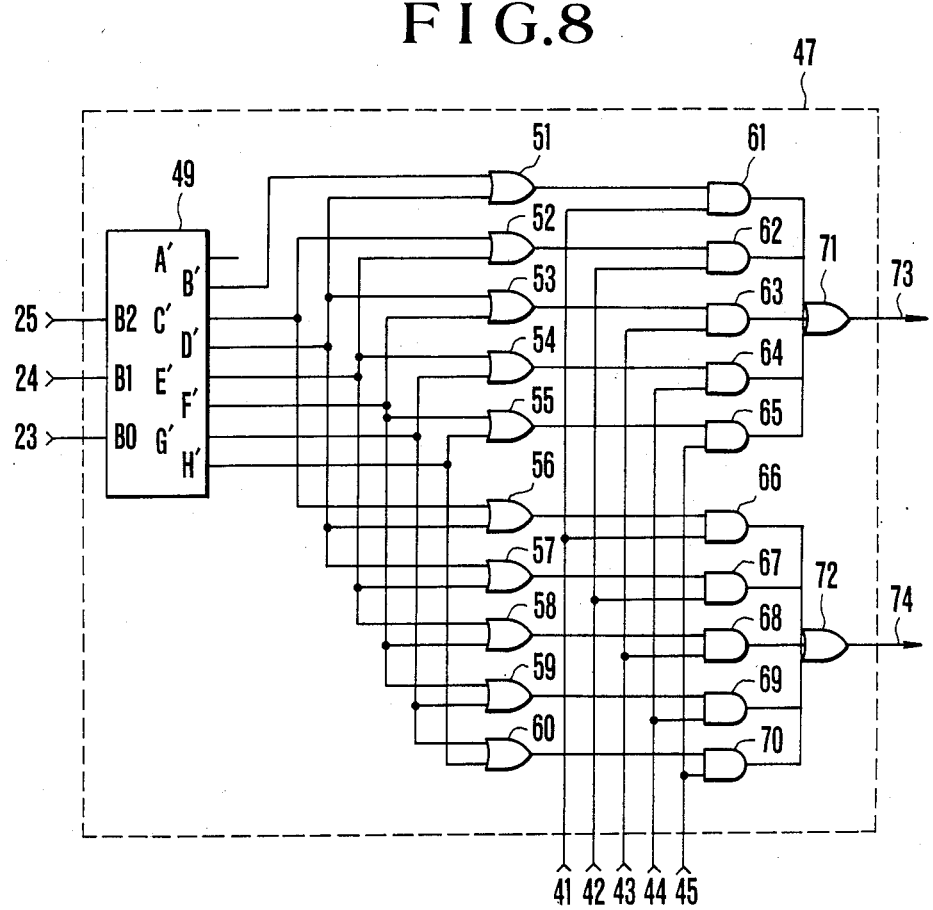
FIG. 8 shows the signal converting circuit of FIG. 4.
FIG. 9 shows the output of the signal converting circuit of FIG. 8.

FIG. 8 shows a signal converting circuit 47. Reference numeral 49 identifies a binary-to-octonal converting circuit. Input terminals B0–B2 are respectively connected to the signal lines 23–25. By converting the incident position signal input from the incident position detecting circuit 13 via the signal lines 23–25 according to the relation shown in FIG. 6, the level of one of the outputs at output terminals A'–H' corresponding to the respective light receiving portions A–H of the PSD 3 is made high. Namely, when each output of the signal lines 23–25 reaches (1,1,0), the level at the terminal D' becomes high. Reference numerals 51–60 identify 2-input OR gates, 61–70 identify 2-input AND gates, and 71 and 72 identify 5-input AND gates, connected as shown in the drawing to convert the light receiving portion signal from the converting circuit 49 into the object position signal to be delivered to signal lines 73 and 74. For example, when the incident position of the light beam when the level of the signal line 43 becomes high and the light emitting element $1c$ illuminates is on the light receiving portion D, namely when the object is at the position D2, only the level at the terminal D' of the converting circuit 49 becomes high so that the level of the outputs of the OR gates 51, 53, 56 and 57 is high, while the level of the outputs of the OR gates 52, 54, 55, 58, 59, and 60 is low. Here, because only the level of the signal line 43 is high, only the output level of the AND gate 63 becomes high. Consequently, a high level signal is produced in the signal line 73 connected to the output of the OR gate 71, while a low level signal is produced in the signal line 74 connected to the output of the OR gate 72. The converting circuit 47 controls the output of the signal lines 73 and 74 based on the inputs from the signal lines 23–25, 41–45 in such a manner that when the object is at the position D2 the level of the signal line 73 is high, while that of the signal line 74 is low when other light emitting elements illuminate. Even when the object is at another position a predetermined signal is always produced regardless of the illuminant light emitting element $1a-1e$. The relation between the object positions D1–D4 and the signal lines 73 and 74 is shown in FIG. 9.

Figure 10:
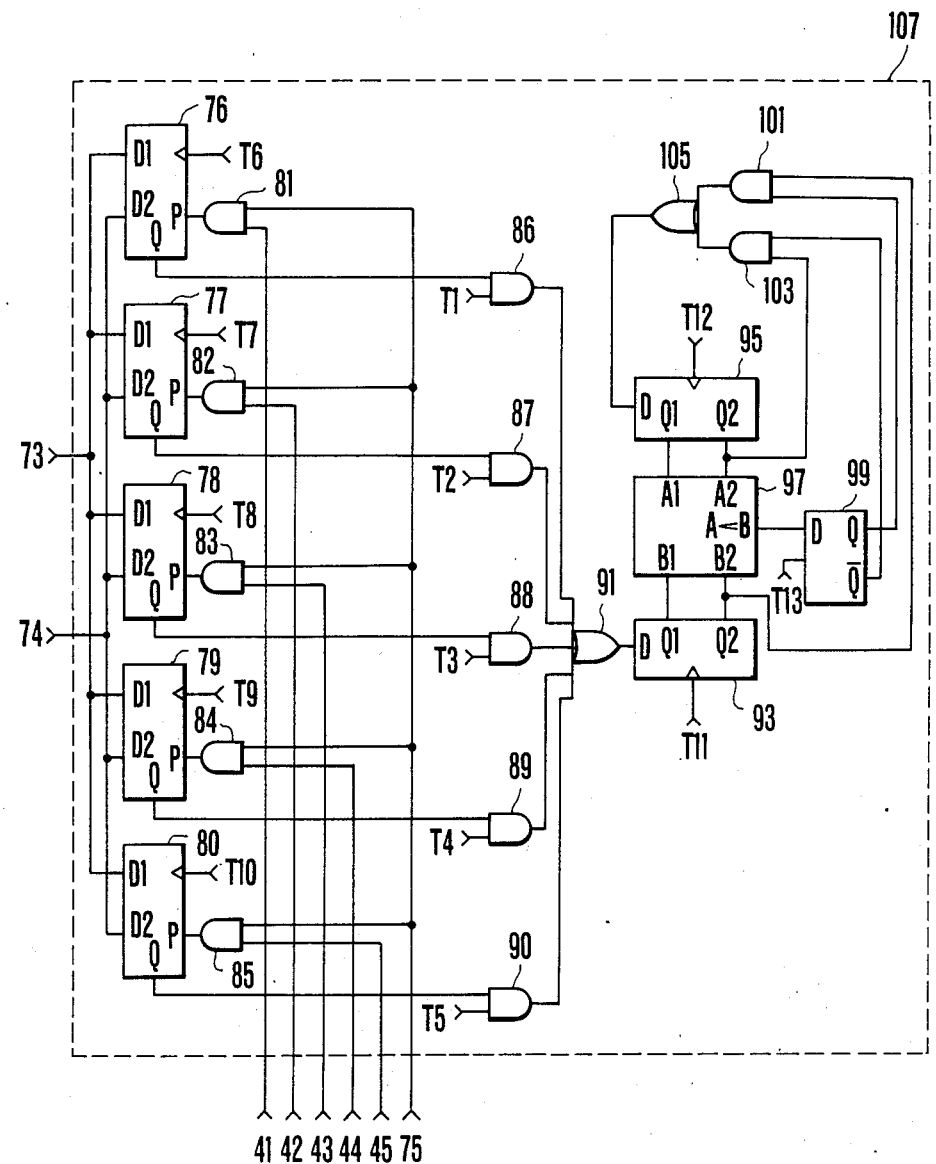
FIG. 10 shows the signal evaluating circuit of FIG. 4.

FIG. 10 shows a signal evaluating circuit 107 for evaluating the object position signal. Shift registers 76–80 carry out the 2-bit parallel-in-serial-out operation and take in the data from the inputs D1 and D2 and transmit the data from an output Q by the clock input when a P input is high level. 2-input AND gates 81–85 have one input connected to the signal lines 41–45 and the other input connected to the signal line 75, whereby by the combination of the signals produced in the signal lines 41-45 and 75 parallel input signals to the shift registers 76-80 are formed.

Figure 12:
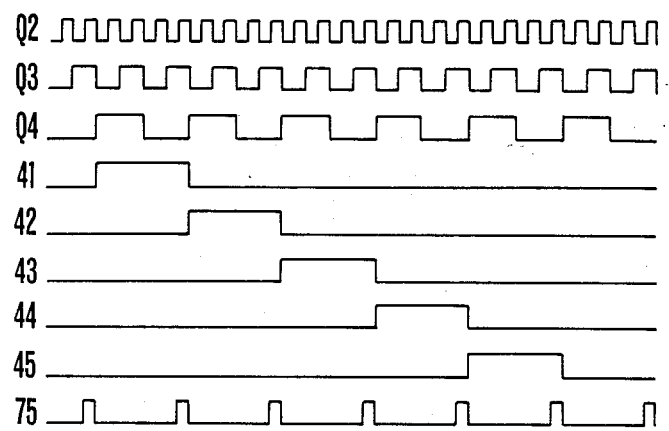
FIG. 12 shows the timing chart of the control circuit signals of FIG. 11.
Figure 13:
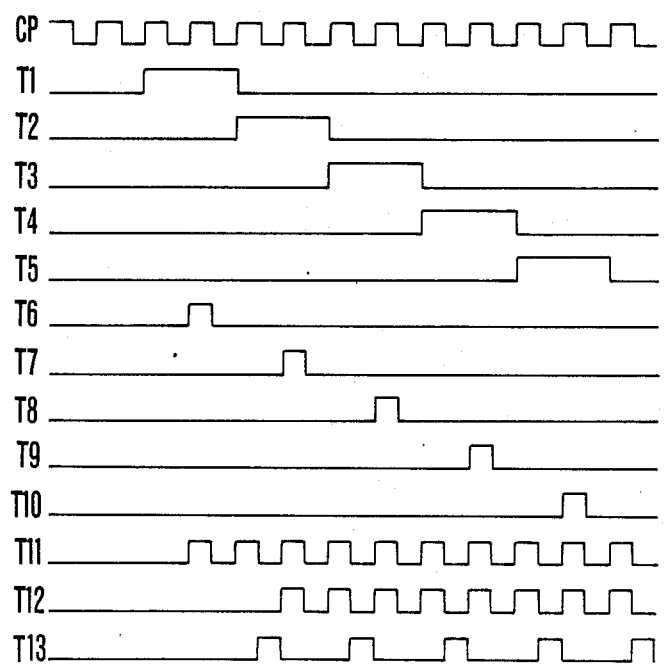
FIG. 13 shows the timing chart of the signal evaluating circuit signals of FIG. 10.

FIG. 12 shows the timing chart of the signals produced in the signal lines 41-45 and 75. By parallel signals the object position signals formed by the light beam from the light emitting elements 1a-1e are stored in the shift registers 76-80. Reference symbols T1-T13 in FIG. 10 identify timing signals delivered from the timing circuit (not shown). FIG. 13 shows the timing chart of a reference clock pulse CP and each timing signal.

AND gates 86-90 deliver the object position signals stored in the shift registers 76-80 in sequence via an OR gate 91 when the level of the timing signals T1-T5 becomes high, respectively. 2-bit shift registers 93 and 95 take in the clock input from the D input based on the clock input, whereby 2-bit outputs Q1 and Q2 are respectively connected to a digital comparator 97. The digital comparator 97 compares the data from the shift register 93 with that from the shift register 93 is greater than data A from the shift register 95 in such a manner that when data B from the shift register 95 the level at terminal A<B becomes high.

A D type Flip Flop 99 stores the A<B output of the digital comparator 97. Reference numerals 101 and 103 identify AND gates and 105 an OR gate, constituting a select gate for the D input of the shift register 95. When the level of the Q output of the Flip Flop 99 is high, the data transmitted from the shift register 93 is put in the shift register 95, while the level of a $\bar{Q}$ output is high the data in the shift register 95 is put in again. Furthermore, all the shift registers 76-80, 93, 95 and the flip flop 99 are reset by a power-up clear circuit (not shown) when measurement is started. With the above construction, the data input from the shift registers 76-80 in sequence to the shift register 93 is compared with the data of the shift register 95 in such a manner that only when the data of the shift register 93 is greater than the data of the shift register 93 is it transferred to the shift register 95. Otherwise the data of the shift register 95 is held. Consequently, at the termination of the timing chart in FIG. 13, the greatest amount of data from the object position signals stored in the shift registers 76-80 is stored in the shift register 95. As is clear from the relation in FIG. 9, the greatest amount of data corresponds to the signal for the shortest distance from the object position data delivered corresponding to the focus targets 6a-6e.

Furthermore, in the present embodiment, after termination of the distance measuring operation for individual focus targets 6a-6e, focusing of the photographic lens is adjusted based upon the object position data stored in the shift register 95.

Figure 11:
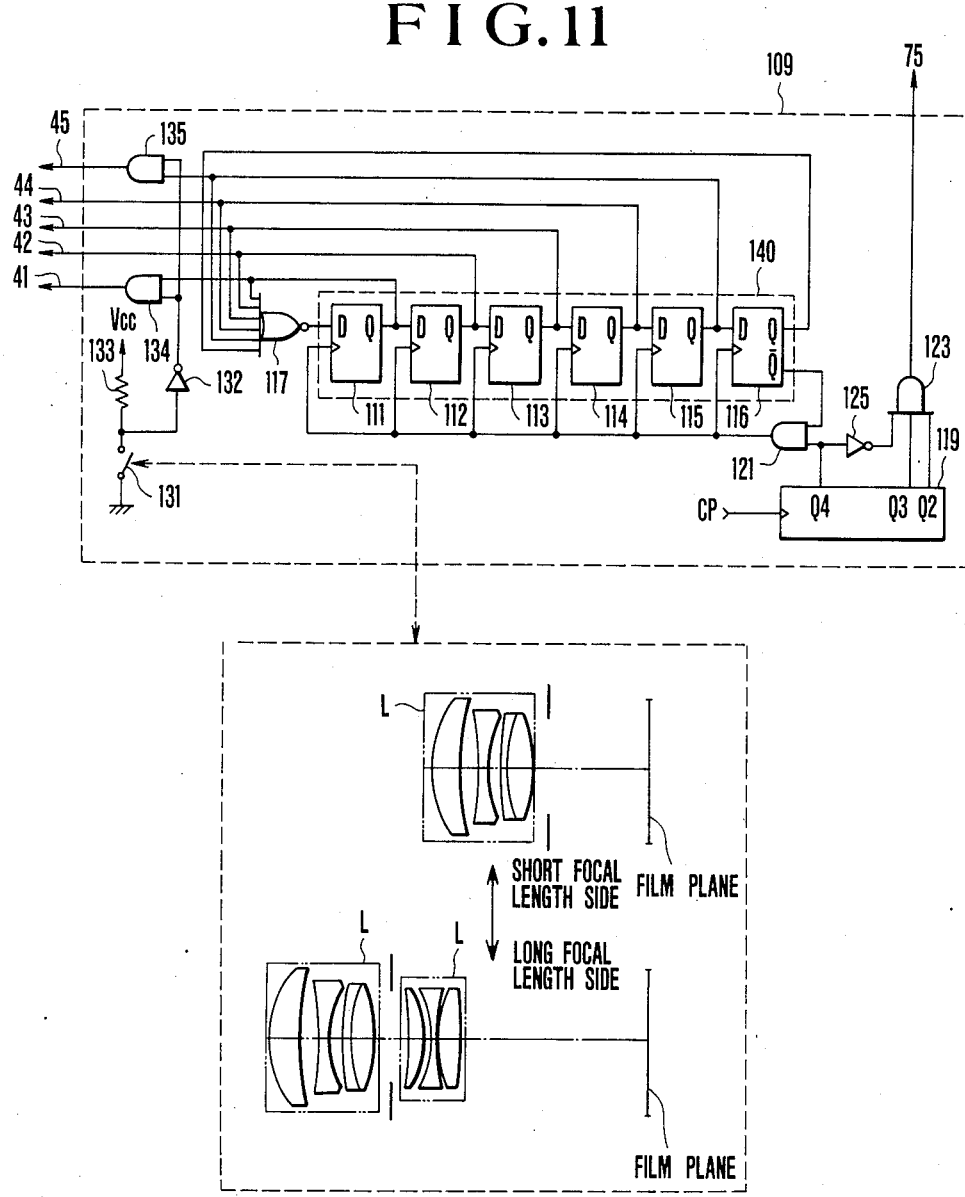
FIG. 11 shows the control circuit of FIG. 4.

FIG. 11 shows a control circuit 109. D type Flip Flops 111-116 constitute a shift register 140. A NOR gate 117 is delivered with the Q output of the Flip Flops 111-116, wherein the level of the Q output of each of the Flip Flops 111-116 is low, the level of the D input of the Flip Flop 111 is high. Reference numeral 119 identifies a counter whose clock input is the reference clock CP, and reference numeral 121 identifies an AND gate whose inputs are the $\bar{Q}$ output of the Flip Flop 116 and the Q4 outputs of the counter 119, whereby the AND gate 121 delivers the Q4 output of the counter 119 as the clock of the shift register 140, as long as the level of the $\bar{Q}$ output of the Flip Flop 116 is high. Reference numeral 123 identifies an AND gate whose inputs are the Q2 and Q3 outputs of the counter 119 and the Q4 output inverted by an inverter 125, whereby the output of the AND gate 123 is connected to the signal line 75.

A switch 131 for changing the distance measuring range, is operatively associated with the change of the focal length of a photographic lens L so as to be closed when the photographic lens L is at the side of the short focal length and to be opened when the lens L is at the side of the long focal length. Reference numeral 132 identifies an inverter whose output is at a low level when the switch 131 is opened because the input is pulled up via a resistor 133 connected to the power source Vcc and whose output is at a high level when the switch 131 is closed because the input is earthed. AND gates 134 and 135 are respectively input with the Q output of the Flip Flops 111 and 115 and when the output of the inverter 132 is low, whereby when the switch 131 is opened, the level of the AND getes 134 and 135 are low because of the output level of the inverter 132, while when the switch 131 is closed, the AND gates 134 and 135 allow the passage of the Q outputs of the Flip Flops 111 and 115 because the output of the inverter 132 is high. The output of the AND gate 134 is connected to the signal line 41, the Q output of the Flip Flop 112 to the signal line 42, the Q output of the Flip Flop 113 to the signal line 43, the Q output of the Flip Flop 114 to the signal line 44 and the output of the AND gate 135 to the signal line 45.

When the distance measuring operation is started, the counter 119 and the Flip Flops 111-116 are reset by the power-up clear circuit (not shown) and the Q outputs of the Flip Flops 111-116 are all at low levels so that at this time the output of the NOR gate 117 is at a high level. Furthermore, at this time the $\bar{Q}$ output of the Flip Flop 116 is at a high level so that the Q4 output of the counter 119 is delivered as clock to the shift register 140 via the AND gate 121.

Now, suppose that the switch 131 is closed, namely, the photographic lens L is set at a short focal length. When the first clock is given to the shift register 140, the Q output of the Flip Flop 111 becomes high level so that the level of the signal line 41 becomes high, the light emitting element 1a flickers and the distance measuring operation for the focus target 6a in FIG. 1 starts. Furthermore, the Q output of the Flip Flop 111 becomes high, when the output of the NOR gate 117 becomes low. Then when the clock is input, the Q output of the Flip Flop 111 is low level, while the Q output of the Flip Flop 112 becomes high level so that the signal line 41 becomes low level, while the signal line 42 becomes high level so that the light emitting element 1b flickers and the object of the distance measuring operation is changed from the focus target 6a to the focus target 6b. In the same way the light emitting element 1c, 1d and 1e flicker. After that, when the 6th clock is input and the Q output of the Flip FLop 116 becomes high level, the $\bar{Q}$ output thereof also becomes low level so that the output of the AND gate 121 also becomes low level and the input of the clock to the shift register 140 is prohibited. Furthermore, at this time the signal lines 41-46 are all at low levels so that the light emitting elements 1a-1e are all put out. FIG. 12 shows the relation between the outputs of the signal lines 41-46 and 75 and the output of the counter 119. When the switch 131 is opened, namely the photographic lens L is set at the side of the long focal length, the signal lines 41 and 45 remain at low levels so that the light emitting elements 1a and 1e do not flicker and the disance measuring operation for the focus targets 6a and 6e are prohibited.

Namely, in this case only the focus targets 6b, 6c and 6d inside the photographic range 5b at the side of the long focal length are selected. In this case, the AND gates 81 and 85 to which the signal lines 41 and 45 in FIG. 10 remain at low level so that the shift registers 76 and 80 remain reset by the power up clear circuit. Namely, in this case, the shift registers 76 and 80 keep holding the data (0, 0) for the position D1 of the most distant object, so that no influence is given to the operation of the signal evealuating circuit 107 giving priority to the short distance data. Other operations are the same as in the case of the short focal length so that the explanations are omitted.

The distance measureing system of the automatic focusing camera to which the present invention is applied is not limited to the above embodiment, and it goes without saying that even if the number of the light emitting is only one any camera having a distance measuring system so designed that a plurality of focus targets can be set, for example, a distance measuring system so designed that the projection direction can be changed by moving the light emitting element or the projection lens will do. Further, even if only one focus target can be set, the present invention can be applied to the distance measuring system by making the range of the focus target large or small according to the focal length of the photographic lens.

Further, the signal evaluation circuit which converts respective distance signals obtained for a plurality of focus targets into the most suitable distance measurement information is not always limited to the above embodiment. A proper method can be taken, for example, by using the mean signal of the above respective distance information as the distance information.

As mentioned above in detail, according to the present invention, in the case of the automatic focusing camera in which, by setting a plurality of focus targets, a wide range of the photographic picture plane is made as the distance measurement object, irrespective of the change in the photographic picture angle due to the change of the focal length of the photographic lens, the photographic picture plane can be made to coincide with the distance measuring range, so that the danger that the photographic lens would be focused at a wrong distance by the unnecessary distance measuring operation for the object outside of the photographic picture plane can completely be avoided, while the wasteful current consumption is avoided.

What is claimed is:

1. An automatic focusing camera comprising:
   (A) distance measuring means capable of automatically measuring an object distance; and
   (B) change over means for changing over a distance measuring range of the distance measuring means to a range appropriate to a photographic picture angle according to the change in focal length of a photographic optical system; and
   wherein the distance measuring means includes signal projecting means for projecting a signal light and light sensing means for sensing the light reflected on the object.

2. A camera according to claim 1, wherein the light projecting means includes a plurality of light emitting elements for emitting signal lights which are respectively projected in the different directions so as to enable the distance measurement for a plurality of objects.

3. A camera according to claim 1, wherein the light sensing means includes a position-sensitive-device.

4. A camera according to claim 1, wherein the light projecting means includes projecting means for projecting a plurality of signal lights in a plurality of different directions so as to obtain a plurality of distance information.

5. A camera according to claim 1, wherein the light sensing means includes detecting means for detecting a light sensing position.

6. A camera according to claim 2, wherein the change over means includes associating means for decreasing the number of the light emitting elements for emitting the signal light along as the focal length of the photographic optical system changes to the side of the long focal length.

7. A camera according to claim 4, wherein the change over means includes associating means for decreasing the number of the signal lights projected by the projecting means along as the focal length of the photographic optical system changes to the side of the long focal length.

8. An automatic focus detection device for a camera, comprising:
   (A) focal point adjustment information detection means for detecting focal point adjustment information relative to an object by receiving a light reflected from the object; and
   (B) change over means for changing a detectable angle of the focal adjustment information detection means in response to changes in a picture angle of a photo-taking optical system so as to render the detectable picture angle suited to the picture angle of the photo-taking optical system wherein said change over means includes electrical switch means for changing over the detectable picture angle of the focus adjustment information detection means in response to the change in the picture angle of the photo-taking optical system.

9. An automatic focus detection device for a camera, comprising:
   (A) distance measuring means for automatically measuring the distance of an object; and
   (B) change over means for changing a distance measurable picture angle of said distance measuring means in response to changes in a picture angle of a photo-taking optical system so as to render the picture angle of the distance measuring means suitable to that of the photo-taking optical system, wherein said change over means includes electrical switch means for changing over the distance measurable picture angle of the distance measuring means in response to the changes in the picture angle of the photo-taking optical system.

10. An automaic focus detection device for a camera, comprising:
   (A) focal point adjustment information detection means for detecting information of a plurality of focal point adjustments corresponding to a plurality of targets in a photographic scene; and
   (B) change over means for changing targets in the photographic scene detectable by the focal point adjustment information detection means in response to changes in the picture angle of a photo-taking optical system so as to render the targets suitable to the picture angle of the photo-taking optical system, wherein said change over means includes electrical switch means for changing over the detectable picture angle of the focus adjustment information detection means in response to the changes in the picture angle of the photo-taking optical system.

* * * * *